United States Patent
Palanisamy et al.

(10) Patent No.: US 9,928,761 B2
(45) Date of Patent: Mar. 27, 2018

(54) DUAL MODE AIRCRAFT INDICATOR SIGN

(71) Applicant: Goodrich Aerospace Services Private Limited, Bangalore, Karnataka (IN)

(72) Inventors: Jai Ganesh Palanisamy, Karnataka (IN); Aravind Edupalli, Telangana (IN); Murugapandian Thangavelu, Karnataka (IN)

(73) Assignee: GOODRICH LIGHTING SYSTEMS, INC., Oldsmar, FL (US)

( * ) Notice: Subject to any disclaimer, the term of this patent is extended or adjusted under 35 U.S.C. 154(b) by 0 days.

(21) Appl. No.: 15/448,112

(22) Filed: Mar. 2, 2017

(65) Prior Publication Data

US 2018/0033346 A1    Feb. 1, 2018

(30) Foreign Application Priority Data

Jul. 28, 2016    (IN) .............................. 201611025878

(51) Int. Cl.
| | |
|---|---|
| *G09F 13/04* | (2006.01) |
| *G09F 13/00* | (2006.01) |
| *G08B 5/36* | (2006.01) |
| *G09F 13/22* | (2006.01) |
| *B64D 47/02* | (2006.01) |

(52) U.S. Cl.
CPC .......... *G09F 13/005* (2013.01); *B64D 47/02* (2013.01); *G08B 5/36* (2013.01); *G09F 13/22* (2013.01); *G09F 2013/0459* (2013.01); *G09F 2013/222* (2013.01)

(58) Field of Classification Search
CPC .......................... G09F 13/04; G09F 2013/0459
USPC ......................................................... 340/471
See application file for complete search history.

(56) References Cited

U.S. PATENT DOCUMENTS

| | | | |
|---|---|---|---|
| 4,029,994 A | 6/1977 | Iwans | |
| 4,899,089 A | 2/1990 | Hayes | |
| 5,633,565 A * | 5/1997 | Friedman | ............... F21S 9/037 |
| | | | 136/291 |
| 7,026,768 B1 | 4/2006 | Ruiz | |
| 7,880,636 B2 | 2/2011 | Heym | |
| 8,911,134 B2 | 12/2014 | Hsu | |

(Continued)

FOREIGN PATENT DOCUMENTS

| | | |
|---|---|---|
| EP | 2958088 A1 | 12/2015 |
| WO | 2014162131 A1 | 10/2014 |

OTHER PUBLICATIONS

European Search Report for Application No. 17183534.1-1903, dated Dec. 7, 2017, 9 pages.

*Primary Examiner* — Kevin Kim
(74) *Attorney, Agent, or Firm* — Cantor Colburn LLP

(57) ABSTRACT

A device for forming a dynamic image on an aircraft sign includes a plurality of light sources, an input power line, a first timer and a second timer both connected to an enable input and a plurality of delay circuits each connected to a different one of the light sources. The system also includes a counter having a plurality of counter outputs, the counter receiving a counting pulse from the first timer in a dynamic mode of operation and disable signal from the second timer after expiration of a preset time, the expiration of the preset time causing the device to transfer from the dynamic mode to a static mode where each of the plurality of light sources are simultaneously illuminated.

16 Claims, 3 Drawing Sheets

(56) References Cited

U.S. PATENT DOCUMENTS

| | | | |
|---|---|---|---|
| 2007/0069881 A1* | 3/2007 | Dohan | B60Q 1/34 340/465 |
| 2008/0130269 A1* | 6/2008 | Tseng | H05B 33/0842 362/103 |
| 2008/0309478 A1* | 12/2008 | Morales | B60Q 1/444 340/467 |
| 2010/0013658 A1 | 1/2010 | Chen | |
| 2010/0134272 A1* | 6/2010 | Palacios | A42B 3/0453 340/475 |
| 2014/0300462 A1* | 10/2014 | Russ | B60Q 1/46 340/471 |
| 2016/0027266 A1 | 1/2016 | McDonagh et al. | |

* cited by examiner

DUAL MODE AIRCRAFT INDICATOR SIGN

FOREIGN PRIORITY

This application claims priority to India Provisional Patent Application No. 201611025878 on Jul. 28, 2016, the entire contents of which is incorporated herein by reference.

BACKGROUND

The present disclosure relates generally to aircraft and more specifically, to actively controller indicator signs.

Passengers on aircrafts are able to view illuminated signs throughout the cabin. These warning and indicator signs include seat belt signs, attendant signs, and non-smoking signs. As the needs of the airlines change more indicators will become useful. Current sign boards are static. Backlights (e.g., diodes or other light sources) in the sign boards are glowing constantly to show the instructions printed on the lens to the passenger.

For example, FIGS. 1A and 1B show examples of a static EXIT sign. The sign 100 includes letters 102 that, in this example, spell out the word EXIT but other words could be used, and of course, the words could also be in another language. The signs 100 also includes arrows 104a/104b that "point" to an exit location. Such a sign 100 may be located in an overhead position in aircraft.

In some cases, the Federal Aviation Regulations (FARs) have certain aircraft sign requirements. For example, FARs PART-25 relates to emergency exit signs and require that airplanes that have a passenger seating configuration, excluding pilot seats, of 10 seats or more must meet the following requirements: (i) Each passenger emergency exit locator sign required by §25.811(d)(1) and each passenger emergency exit marking sign required by §25.811(d)(2) must have red letters at least 11/2, inches high on an illuminated white background, and must have an area of at least 21 square inches excluding the letters. The lighted background-to-letter contrast must be at least 10:1. The letter height to stroke-width ratio may not be more than 7:1 nor less than 6:1. These signs must be internally electrically illuminated with a background brightness of at least 25 foot-lamberts and a high-to-low background contrast no greater than 3:1.

BRIEF DESCRIPTION

A device for forming a dynamic image on an aircraft sign is disclosed. The device includes a plurality of light sources, an input power line, a first timer and a second timer both connected to an enable input and a plurality of delay circuits each connected to a different one of the light sources. The device further includes a counter having a plurality of counter outputs, the counter receiving a counting pulse from the first timer in a dynamic mode of operation and disable signal from the second timer after expiration of a preset time, the expiration of the preset time causing the device to transfer from the dynamic mode to a static mode where each of the plurality of light sources are simultaneously illuminated. The device also includes a plurality of selector elements each coupled to the input power line and a different one of the plurality of counter outputs, each of the plurality of the selector elements having an output connected to an input of a different one of the plurality of delay circuits, each selector element causing power to be passed to the delay circuit to which it is attached for a time period determined by the counter output connected to it.

An aircraft comprising a device for forming a dynamic image on an aircraft sign is also disclosed. The device includes a plurality of light sources, an input power line, a first timer and a second timer both connected to an enable input and a plurality of delay circuits each connected to a different one of the light sources. The device further includes a counter having a plurality of counter outputs, the counter receiving a counting pulse from the first timer in a dynamic mode of operation and disable signal from the second timer after expiration of a preset time, the expiration of the preset time causing the device to transfer from the dynamic mode to a static mode where each of the plurality of light sources are simultaneously illuminated. The device also includes a plurality of selector elements each coupled to the input power line and a different one of the plurality of counter outputs, each of the plurality of the selector elements having an output connected to an input of a different one of the plurality of delay circuits, each selector element causing power to be passed to the delay circuit to which it is attached for a time period determined by the counter output connected to it.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

In accordance with embodiments of the disclosure, device and system for active (e.g., dynamic) indicator signs are provided.

In one embodiment, the dynamic sign includes multiple small chambers with one or more separately controllable LED lights therein. The LED lights are controlled by a driver circuit such that the instructions (e.g., the arrows) are dynamic. The dynamic nature may be provided by selectively energizing and controlling the brightness of the LEDs with a customized driver circuit. In particular, when the lights sign is in a dynamic mode, LED light intensity is turned down and up in sequence to animate the movement of the light which will instruct the passenger clearly. When the dynamic mode is not activated the circuit may control the sign just like existing static signs.

Figure 1A:
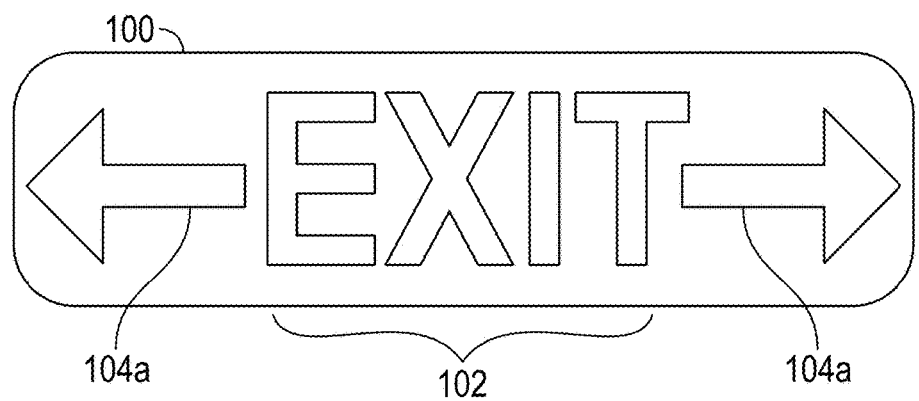
FIGS. 1A and 1B are examples of prior art aircraft exit signs.
Figure 1B:
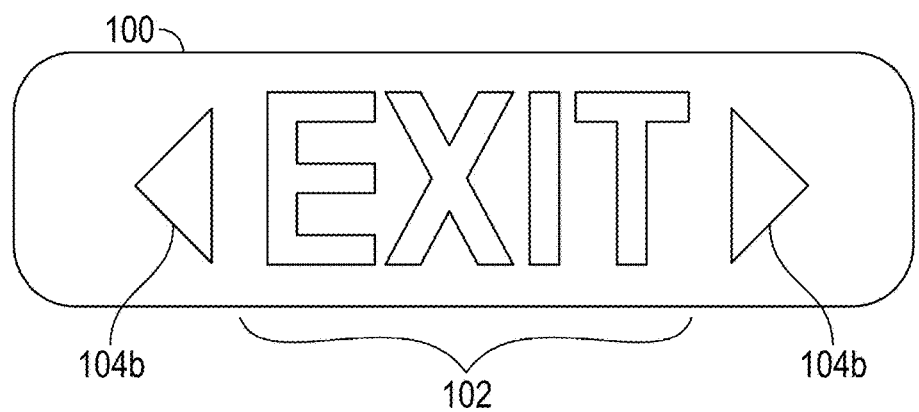
Figure 2:
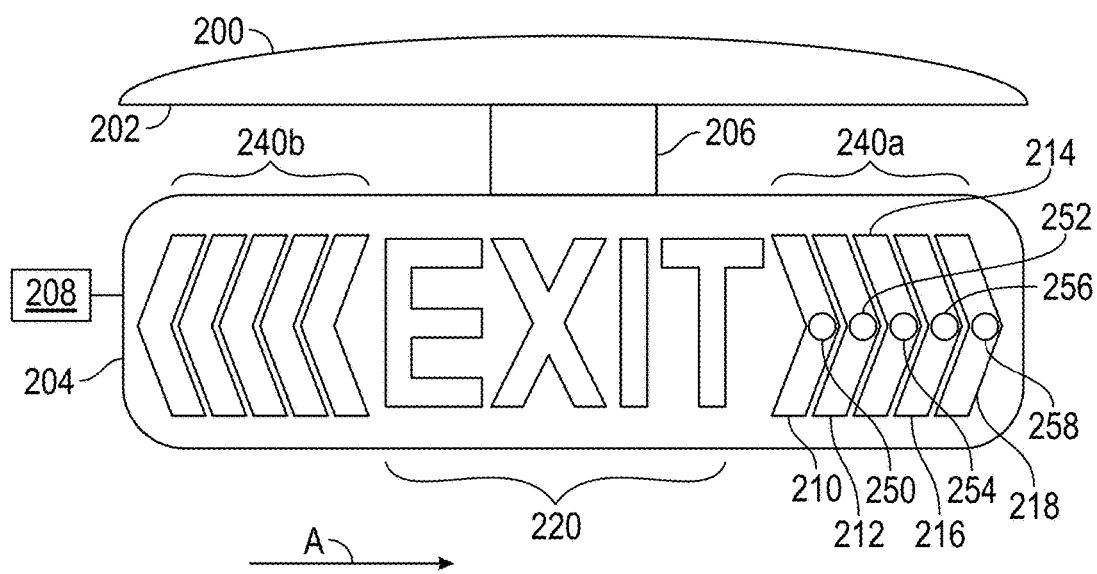
FIG. 2 is a partial cross section of an aircraft including an illustration of a sign above the aisle near the Exit Door that may operate in accordance with some embodiments described herein.

Referring to FIG. 2, a partial cross-section of an aircraft 200 is shown. In FIG. 2, the aircraft 200 includes an internal wall 202 that is shown as a ceiling but the wall 202 could be a side wall in one embodiment. Herein, the internal wall 202 may be referred to as an aircraft ceiling or passenger compartment ceiling. The wall 202 is not, however, limited to being the highest portion of the passenger compartment and could located, for example, below an overhead baggage compartment of the passenger compartment or extend from a side or other wall of the aircraft 200.

The wall 202 is shown supporting an informational sign 204 by an optional support member 206. The support member 206 may be omitted in one embodiment. Further the shape of the support member 206 can be varied and may be formed by screw or other fastener that couples the sign 204 to the wall 202. While shown on an upper surface of the sign 204, the support member 206 could be on the side or bottom of the sign 204. Furthermore, the support member 206 is shown as a single element but it shall be understood that it may be comprised of multiple elements.

The sign 204 may include a text region 220 that delivers a message to one or more passengers within the aircraft 200. As illustrated, the message in the text region 220 is "EXIT" but other messages could be provided. The sign 204 also includes one more active or dynamic regions 240. As illustrated, the sign 204 includes a first dynamic region 240a and second dynamic region 240b. As more fully described below, a control element 208 will cause LED's or other light sources located behind the dynamic regions to alternatively turn on or vary in brightness.

As illustrated, the first dynamic region 240a includes a plurality of lenses 210-218 carried by the sign 204. One or more light sources (e.g., LED's or other light emitting devices) or are disposed behind the plurality of lenses 210-218. The light sources are generally shown by elements 250-258. It shall be understood that more light sources could be added behind each lens or that not every lens includes a light source behind it and that adjacent lenses may "share" light sources.

In one embodiment, the exit sign 204 may include multiple chambers for the LEDs an may only have one Lens or diffuser which will cover all the chambers. Generally the lens or diffuser and its color and size will match with the FAR regulations. This lens/diffusor will allow light coming from the plurality of LEDs to animate the arrow only in intended places where the diffuser is opaque (Not completely transparent) and rest of the places may not allow the light to pass thru. Cambers 252 till 258 in FIG. 2 will not be visible when the sign is operating in static mode due to the opaqueness of the lens/optical diffuser.

In operation, the control unit 208 may cause either light sources 250-258 to turn on, then turn off when the next sequential light source is turned on. For example, in one embodiment, light source 250 is turned on and illuminates lens 210. Then light source 250 is turned off and light source 252 is turned on and illuminates lens 212. Similarly, light source 252 is turned off and light source 254 is turned on and illuminates lens 214, light source 254 is turned off and light source 256 is turned on and illuminates lens 216 and so on until the last light source (e.g., light source 258) sequentially arranged in direction A is reached. In one embodiment, after light source 258 is turned off, light source 250 may be turned on again. In this manner, a repeating and moving directional arrow may be formed in dynamic area 240a. Of course, the same or opposite operation could also be performed in the other dynamic area 240b.

In another embodiment, rather than just turning each light source on and off, each may be respectively ramped from a low power to a high power and then allowed to return (e.g., decay) to a low power. For example, in one embodiment, light source 250 initially at "0" power. This power is then ramped up to a peak value. After the peak value is reached (or near that time) the "next" light source 252 is then powered up. Similarly, light source 252 allowed to decay and light source 254 is ramped up and illuminates lens 214 until light source 254 begins decaying and light source 256 is turned on and illuminates lens 216 and so on until the last light source (e.g., light source 258) sequentially arranged in direction A is reached. In one embodiment, after light source 258 is turned off or starts to decay or reaches a specified power level, light source 250 may be turned on again. In this manner, a repeating and moving directional arrow may be formed in dynamic area 240a. Of course, the same or opposite operation could also be performed in the other dynamic area 240b. It shall be understood that the event that causes the next light source to be turned may be independent of the operation of a prior sequential light source. For example, a timer or delay circuit could be used. The rate at which a particular light source turns off could be controlled, for example by a switch (e.g., instant off") or a decay circuit such as an resistor-capacitor (RC) circuit.

Figure 3:
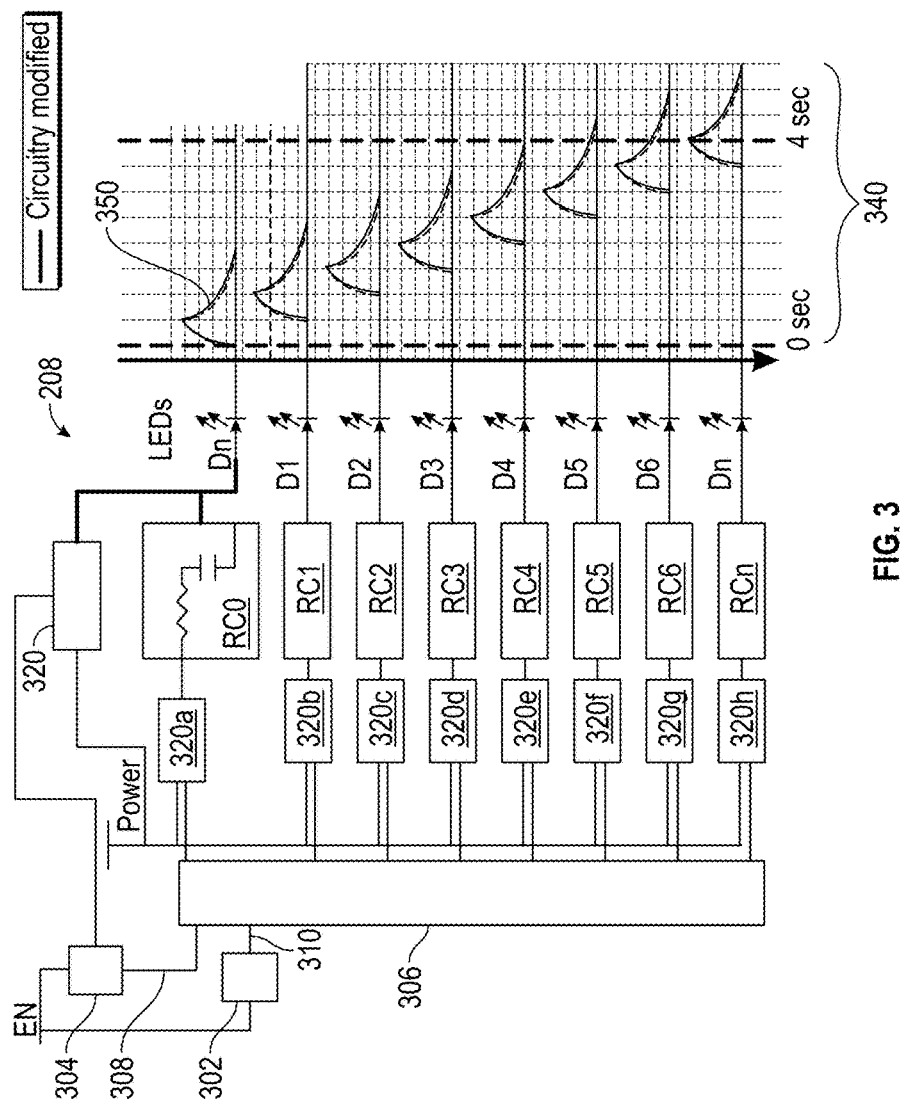
FIG. 3 is circuit diagram of an example control circuit that may be utilized in combination with a sign such as the sign shown in FIG. 2.

FIG. 3 shows an example of a circuit 208 that may be used to control the sign 204. In this example, the dynamic operation of the sign 204 may be due to providing delayed pulses to light sources that are shown as LEDs. Of course other light sources could be used. A timing diagram 340 showing the "on" times for the "n" diodes D0-Dn for each of the LED's is arranged directly next to the LEDs. For example, LED D0 is emitting light for a two second period. The light ramps up and then decays as illustrated by trace 350. As illustrated, each successive LED begins to ramp up 0.5 seconds after the previous LED. It shall be understood that D0 will then begin to ramp again 0.5 second after the last LED (Dn) has started to ramp up. While illustrated as having a 0.5 second ramp up and 1.5 second decay, if shall be understood that trace 350 (or any other trace in graph 340) could have different characteristics. The particular characteristic may be selected by an input circuit. The illustrated input circuits for D0 is a serial RC circuit but other types of input circuits could be used. In the event that an RC circuit is used, the resistance and capacitance values can be selected to achieve the desired rise and fall times (in this case, a 0.5 second rise is followed by a 1.5 second decay). The following discussion assumes that the input circuits are RC circuits and, thus, each input circuit is labeled "RCx". Also, herein, the number of diodes and input circuits can be varied from 2 to n depending on the context and the eight shown in FIG. 3 are merely an example.

In operation, each input circuit RCx receives a sequentially applied logical high voltage (provided by the Power connection). That is, the first input circuit RC0 receives a first pulse for a first time period (e.g, 0.5 seconds) and then the next input circuit RC1 receives a pulse for the same time period and so on. The application of the pulses can be provided by the combination of a counter 306 driven by a dynamic operation clock 302. Upon receipt of an enable (EN) signal, the dynamic operation clock 302 (which may be any type of digital clock) begins to provide a periodic clock pulse via line 310 to counter 306. In this example, the counter 306 sequentially activates (e.g., drives to a logical "1") each of its output. Each output is connected to a different on of plurality of selector elements 320. The selector elements 320 are connected to power and when they receive a logical 1 its input, it allows power to flow to the input circuit connected to its output. In this example, input circuit RC0 is connected to the output of selector element 320a, input circuit RC1 is connected to the output of selector element 320b, input circuit RC2 is connected to the output of selector element 320c, input circuit RC3 is connected to the output of selector element 320d, input circuit RC4 is connected to the output of selector element 320e, input circuit RC5 is connected to the output of selector element 320f, and input circuit RC6 is connected to the output of selector element 320g, input circuit RCn is connected to the output of selector element 320h. In one embodiment, the selector element is an AND gate but the skilled artisan will realize that other elements could be used. Further, it shall be understood that the rate at which the counter 302 pulses will set the rate at which each successive diode is illuminated as well as how long power is supplied to the diode. In one embodiment, the dynamic operation clock 302 provides a 2 Hz pulse to the counter 306 and counter 306 is an n-bit ring counter. In the example shown in FIG. 3 the counter 306 may be an 8-bit ring counter.

In one embodiment, an optional second or cutoff clock 304 is provided. This clock begins counting when the dynamic operation clock begins. The clock or timer 304 counts for a preset time period (e.g., 30 seconds). After that time, the timer 304 disables counter 306 via a signal connection 308 and causes override selector 320 to allow power to be constantly provided to only D0 and the illumination elements that light the letters for "EXIT". Thus, after the present time period the sign 204 of FIG. 2 operates in the same manner as a static sign and light source 250 and Respective light source in 240b arrangement are ON all the time and at the same intensity.

Figure 4:
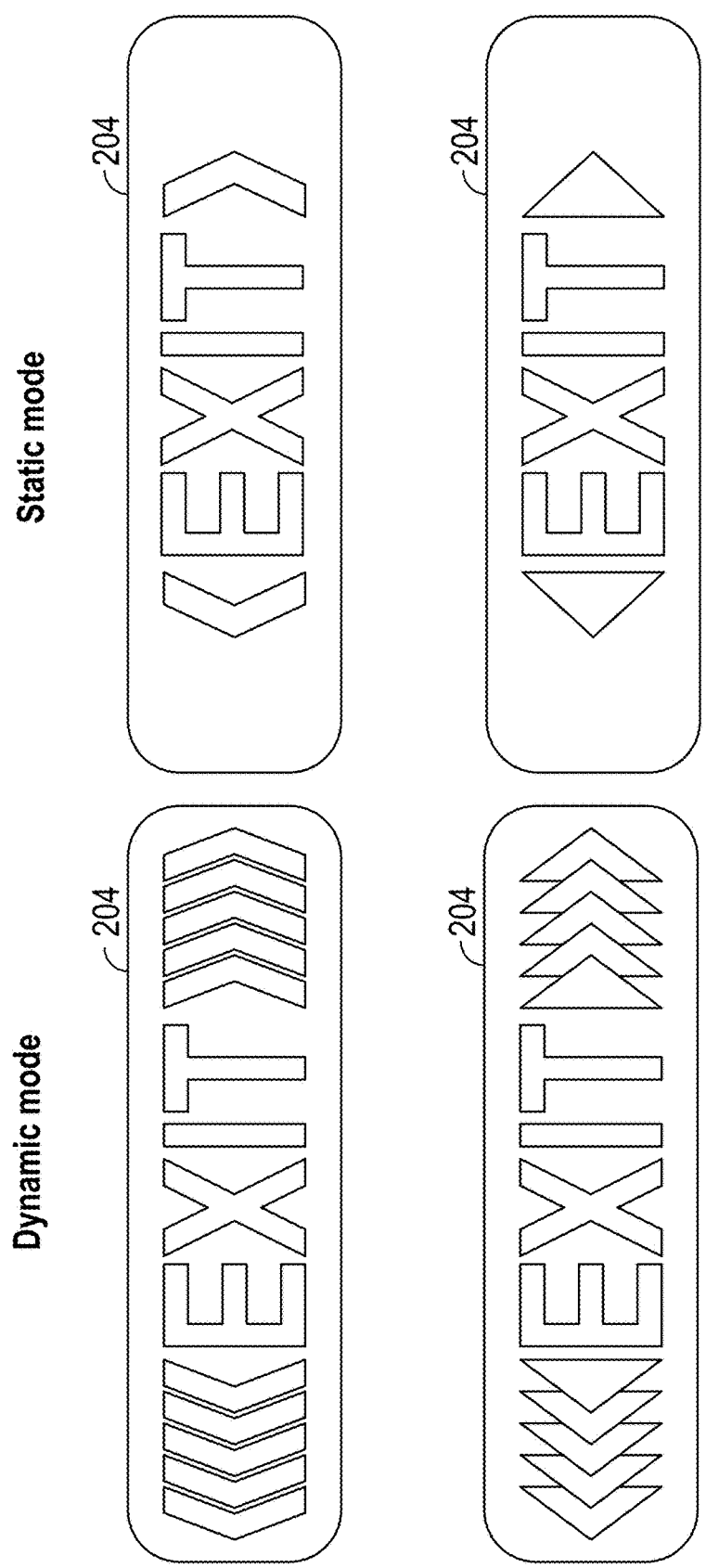
FIG. 4 shows different examples of signs in dynamic and static modes.

Examples of signs in the dynamic and static modes are shown in FIG. 4. In the dynamic mode, one or more arrows may be illuminated and in the static mode, only one arrow is illuminated.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A device for forming a dynamic image on an aircraft sign, the device including:
   a plurality of light sources;
   an input power line;
   a first timer and a second timer both connected to an enable input;
   a plurality of delay circuits each connected to a different one of the light sources;
   a counter having a plurality of counter outputs, the counter receiving a counting pulse from the first timer in a dynamic mode of operation and disable signal from the second timer after expiration of a preset time, the expiration of the preset time causing the device to transfer from the dynamic mode to a static mode where each of the plurality of light sources are simultaneously illuminated; and
   a plurality of selector elements each coupled to the input power line and a different one of the plurality of counter outputs, each of the plurality of the selector elements having an output connected to an input of a different one of the plurality of delay circuits, each selector element causing power to be passed to the delay circuit to which it is attached for a time period determined by the counter output connected to it.

2. The device of claim 1, wherein the counter provides a high level output in succession to each counter output that causes the light sources to be selected illuminated in the dynamic mode.

3. The device of claim 1, wherein all of the plurality of light sources are illuminated in the static mode.

4. The device of claim 1, wherein in the dynamic mode, the counter causes a first light source to receive power by providing a high level output to a first one of the plurality of selector element connected to it and then, after the high level output is provided to the first one the plurality of selector elements, providing a high level output to a second one of the plurality of selector elements such that a second light source of the plurality of light sources receives power and providing a low level output to the first one the plurality of selector elements.

5. The device of claim 4, after the high level output is provided to the second one the plurality of selector elements, the counter providing a high level output to a third one of the plurality of selector elements such that a third light source of the plurality of light sources receives power and providing a low level output to the second one the plurality of selector elements.

6. The device of claim 1, wherein the plurality of light sources are light emitting diodes.

7. The device of claim 1, wherein the delay circuit is formed by resistor-capacitor circuit.

8. The device of claim 1, further comprising a bypass circuit having an output connected to each of the plurality of light sources and inputs connected to power and an output of the second timer;
   wherein the bypass circuit allows power to pass to all of the plurality of light sources after the expiration of the preset time.

9. An aircraft comprising:
   a device for forming a dynamic image on an aircraft sign, the device including:
      a plurality of light sources;
      an input power line;
      a first timer and a second timer both connected to an enable input;
      a plurality of delay circuits each connected to a different one of the light sources;
      a counter having a plurality of counter outputs, the counter receiving a counting pulse from the first timer in a dynamic mode of operation and disable signal from the second timer after expiration of a preset time, the expiration of the preset time causing the device to transfer from the dynamic mode to a static mode where each of the plurality of light sources are simultaneously illuminated; and
      a plurality of selector elements each coupled to the input power line and a different one of the plurality of counter outputs, each of the plurality of the selector elements having an output connected to an input of a different one of the plurality of delay circuits, each selector element causing power to be passed to the delay circuit to which it is attached for a time period determined by the counter output connected to it.

10. The aircraft of claim 9, wherein the counter provides a high level output in succession to each counter output that causes the light sources to be selected illuminated in the dynamic mode.

11. The aircraft of claim 9, wherein all of the plurality of light sources are illuminated in the static mode.

12. The aircraft of claim 9, wherein in the dynamic mode, the counter causes a first light source to receive power by providing a high level output to a first one of the plurality of selector element connected to it and then, after the high level output is provided to the first one the plurality of selector elements, providing a high level output to a second one of the plurality of selector elements such that a second light source of the plurality of light sources receives power and providing a low level output to the first one the plurality of selector elements.

13. The aircraft of claim 12, after the high level output is provided to the second one the plurality of selector elements, the counter providing a high level output to a third one of the plurality of selector elements such that a third light source of the plurality of light sources receives power and providing a low level output to the second one the plurality of selector elements.

14. The aircraft of claim 9, wherein the plurality of light sources are light emitting diodes.

15. The aircraft of claim 9, wherein the delay circuit is formed by resistor-capacitor circuit.

16. The aircraft of claim 9, further comprising a bypass circuit having an output connected to each of the plurality of light sources and inputs connected to power and an output of the second timer;
wherein the bypass circuit allows power to pass to all of the plurality of light sources after the expiration of the preset time.

* * * * *